(12) United States Patent
Lin et al.

(10) Patent No.: US 8,107,817 B2
(45) Date of Patent: Jan. 31, 2012

(54) METHOD FOR RECEIVING OPTICAL ORTHOGONAL FREQUENCY-DIVISION MULTIPLEXING SIGNAL AND RECEIVER THEREOF

(75) Inventors: Yu-Min Lin, Hsinchu (TW); Dar-Zu Hsu, Tainan County (TW); Hung-Lin Chen, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 505 days.

(21) Appl. No.: 12/464,608

(22) Filed: May 12, 2009

(65) Prior Publication Data
US 2010/0247100 A1 Sep. 30, 2010

(30) Foreign Application Priority Data
Mar. 25, 2009 (TW) .............................. 98109808 A

(51) Int. Cl.
*H04J 14/02* (2006.01)
(52) U.S. Cl. .............................. 398/81; 398/79; 398/202
(58) Field of Classification Search ................. 398/81, 398/79, 202
See application file for complete search history.

(56) References Cited

U.S. PATENT DOCUMENTS

| 7,251,283 | B2 | 7/2007 | Chen |
| 7,310,302 | B2 | 12/2007 | Cimini, Jr. et al. |
| 2010/0178057 | A1* | 7/2010 | Shieh .............................. 398/79 |

OTHER PUBLICATIONS

Zhou et al., All Digital Tracking Loop for OFDM Symbol Timing, IEEE, 2003, pp. 2435-2439.
Yang et al., Timing Recovery for OFDM Transmission, IEEE Journal on Selected Areas in Communications, Nov. 2000, pp. 2278-2291, vol. 18, No. 11.

* cited by examiner

*Primary Examiner* — Kinam Park
(74) *Attorney, Agent, or Firm* — Morris Manning & Martin LLP; Tim Tingkang Xia, Esq.

(57) ABSTRACT

A method for receiving an optical orthogonal frequency-division multiplexing (OFDM) signal and a receiver thereof are applicable to an optical OFDM system. The receiving method includes the following steps. An optical signal is converted into a digital signal. A symbol boundary of the digital signal is estimated. A guard interval of the digital signal is removed according to the symbol boundary, so as to generate an electrical signal. The electrical signal is converted into a plurality of frequency domain sub-carriers in a fast Fourier transform (FFT) manner. A timing offset is estimated with pilot carriers and frequency domain sub-carriers corresponding to the same symbol period. The estimated symbol boundary is compensated with the timing offset. Each frequency domain sub-carrier includes a plurality of pilot carrier signals. Through the receiving method, the timing offset arisen from chromatic dispersion of an optical fiber is effectively estimated and adopted for compensation.

14 Claims, 10 Drawing Sheets

US 8,107,817 B2

METHOD FOR RECEIVING OPTICAL ORTHOGONAL FREQUENCY-DIVISION MULTIPLEXING SIGNAL AND RECEIVER THEREOF

CROSS-REFERENCE TO RELATED APPLICATIONS

This non-provisional application claims priority under 35 U.S.C. §119(a) on Patent Application No(s). 098109808 filed in Taiwan, R.O.C. on Mar. 25, 2009 the entire contents of which are hereby incorporated by reference.

BACKGROUND OF THE INVENTION

1. Field of the Invention

The present invention relates to a receiving method and a receiver for compensating a received signal with a timing offset and a chromatic dispersion obtained by estimation in a system adopting an optical orthogonal frequency-division multiplexing (OFDM) technique.

2. Related Art

An OFDM system is a frequency-division multiplexing (FDM) system adopting a digital multi-carrier modulation method, in which a plurality of orthogonal sub-carriers (or called sub-bands) is used for data transmission. The data is divided into a plurality of parallel data streams or channels corresponding to each sub-carrier respectively. Each sub-carrier transmits the data through a modulation technique with a relatively low symbol rate (for example, quadrature amplitude modulation (QAM) or phase shift keying (PSK)). In this manner, a larger total data rate is achieved in the same bandwidth as compared with that of the single-carrier in the conventional art.

FIGS. 1A and 1B are respectively schematic comparative views of a frequency spectrum distribution of a conventional direct transmission and an OFDM transmission. Referring to FIGS. 1A and 1B, the most significant difference between the direct transmission and the OFDM transmission lies in the bandwidth distribution. Referring to FIG. 1A, the bandwidth occupied by the direct transmission is $f_0$. If the bandwidth $f_0$ is equally divided into five parts $f_1$ with the same width in an OFDM manner, and the sub-bands $f_1$ (that is, the above sub-carriers) are orthogonal with one another, so that the new frequency spectrum distribution is shown in FIG. 1B. In the OFDM transmission, as long as the sub-bands are enough, for each sub-band, basically the frequency response of the sub-band may be approximately considered as flat. That is to say, each sub-band only requires one equalizer with a single coefficient, so as to overcome the attenuation and phase distortion of each sub-channel. In addition, the data rate transmitted by each sub-band is much lower than that of the conventional direct transmission, and an operation clock of the equalizer is naturally reduced proportionally.

When being applied to the wireless communication field, the OFDM technique often faces a common problem of a multi-path effect. The multi-path effect may result in the time-spreading and inter-symbol interference (ISI) problem, which is the so-called frequency-selective channel problem. Usually, the frequency-selective problem is solved by adding a guard interval to each symbol of the OFDM, such that the symbol period is increased accordingly, which further occupies the bandwidth used for data transmission.

When the OFDM technique is applied to an optical communication system, light rays are transmitted in the same optical fiber, so the multi-path effect of the optical OFDM system is not significant. But, due to the chromatic dispersion phenomenon, when a receiving end receives a signal, the synchronization problem among channels and similar multi-path ISI problem exist. The synchronization estimation manner in the optical OFDM system is somewhat different from the conventional estimation manner on the copper wire transmission or wireless OFDM transmission. Therefore, it is necessary to develop a new synchronization estimation method for the optical fiber channel characteristics, thereby avoiding the estimation faults.

In the OFDM system, the techniques relevant to the synchronization estimation (that is, estimation of the timing offset) performed by the receiving end are provided in U.S. Pat. No. 7,310,302, filed on Dec. 18, 2007 and entitled "Method for estimation time and frequency offset in an OFDM system" and U.S. Pat. No. 7,251,283, filed on Jul. 31, 2007 and entitled "Timing offset compensation in orthogonal frequency division multiplexing systems".

In addition, the relevant papers include papers issued by Minjian Zhao, Aiping Huang, Zhaoyang Zhang, and Peiliang Qiu (with reference to All Digital Tracking Loop for OFDM Symbol Timing, IEEE VTC'2003, pp. 2435-2439, vol. 4, October 2003), and papers issued by Baoguo Yang, Khaled Ben Letaief, Roger S. Cheng, and Zhigang Cao (with reference to Timing Recovery for OFDM transmission, IEEE J. Select. Areas Commun., Vol. 18, No. 11, November 2003).

In the conventional art, the method for estimating timing offset applicable to the wireless or copper wire OFDM system has been proposed, but the characteristics of the optical fiber channel are not entirely the same as that of the wireless or copper wire transmission, so that the synchronization estimation manner in the optical OFDM system is different from the conventional estimation manner. The accuracy of the estimation on a symbol boundary may affect the performance of the OFDM frequency domain equalizer or channel estimation, so as to affect the accuracy for demodulating the transferred signal. That is to say, the synchronization estimation and channel estimation techniques directly affect the performance of the entire OFDM system. Therefore, a new synchronization estimation method directed to the optical fiber channel characteristics is required, thereby preventing the estimation faults.

SUMMARY OF THE INVENTION

Since a method for estimating a timing offset applicable to an optical OFDM system is required on a receiving end due to different signal transmission media when an OFDM technique is applied to an optical fiber communication, the present invention is a method for estimating a timing offset and a chromatic dispersion in an optical OFDM system.

The present invention provides a method for receiving an optical OFDM signal, applicable to an optical OFDM receiver. The receiver receives an optical signal emitted by an optical OFDM emitter. The receiving method comprises the steps as follows. In S50, the optical signal is converted into a digital signal. In S52, a symbol boundary of the digital signal is estimated. In S54, a guard interval of the digital signal is removed according to the symbol boundary, so as to generate an electrical signal. In S56, the electrical signal is converted into a plurality of frequency domain sub-carriers Y(k) in a fast Fourier transform (FFT) manner, in which each frequency domain sub-carrier comprises a plurality of symbols, the symbols corresponding to the same frequency domain sub-carrier comprise a plurality of data carrier signals and pilot carrier signals, the pilot carrier signals X(k) are located in the same symbol period, in which k is an integer greater than or equal to $-N/2$ and smaller than $(N/2)-1$, and N is an FFT size.

In S57, a timing offset τ is estimated with the pilot carrier signals X(k) and the frequency domain sub-carriers Y(k) corresponding to the same symbol period. The estimated symbol boundary is compensated with the timing offset.

In S57, the step of estimating the timing offset τ and a chromatic dispersion constant with at least three pilot carrier signals X(k) and at least three frequency domain sub-carriers Y(k) corresponding to the same symbol period comprises the following processes. In S570, a first phase rotation difference is estimated with two pilot carrier signals X(k1) and X(k2) and two corresponding frequency domain sub-carriers Y(k1) and Y(k2). In S572, a second phase rotation difference is estimated with another two pilot carrier signals X(k3) and X(k4) and the corresponding frequency domain sub-carriers Y(k3) and Y(k4). In S574, the timing offset is estimated according to the first phase rotation difference and the second phase rotation difference, in which k1, k2, k3, and k4 are integers greater than or equal to −N/2 and smaller than (N/2)−1, N is an FFT size, k2>k1, k4>k3, and k2−k1=k4−k3.

S57 further comprises a step of estimating the chromatic dispersion constant according to the first phase rotation difference and the second phase rotation difference.

The present invention further provides a receiving end of an optical OFDM system, applicable to receive an optical signal emitted by an emitter of the optical OFDM system. The receiving end comprises an optical-to-electrical converting element, an analog-to-digital converting element, a symbol boundary estimator, a guard interval removal element, an FFT element, and a timing offset estimator. The optical-to-electrical converting element receives and converts an optical signal into an analog signal. The analog-to-digital converting element converts the analog signal into a digital signal. The symbol boundary estimator estimates a symbol boundary according to the digital signal. The guard interval removal element removes a guard interval of the digital signal according to the symbol boundary, so as to generate an electrical signal. The FFT element converts the electrical signal into a plurality of frequency domain sub-carriers Y(k) in an FFT manner, in which each frequency domain sub-carrier comprises a plurality of symbols, the symbols corresponding to the same frequency domain sub-carrier comprise a plurality of data carrier signals and pilot carrier signals. The pilot carrier signals X(k) are located in the same symbol period, in which k is an integer greater than or equal to −N/2 and smaller than (N/2)−1. The timing offset estimator estimates a timing offset τ with at least three pilot carrier signals X(k) and at least three frequency domain sub-carriers Y(k) corresponding to the same symbol period. The symbol boundary estimator compensates the symbol boundary according to the timing offset.

Through the receiving method and the receiver, the timing offset and the chromatic dispersion constant can be effectively estimated. The estimated symbol boundary is compensated with the timing offset, such that the signal receiving accuracy is improved. The length (i.e., time) of the guard interval is set according to the chromatic dispersion constant, so as to shorten the time (i.e., bandwidth) occupied by the guard interval, and improve the bandwidth used for data transmission.

In order to have a further understanding of above features, implementation, and efficacies of the present invention, a detailed description is given below with reference to the embodiments and accompanying drawings.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
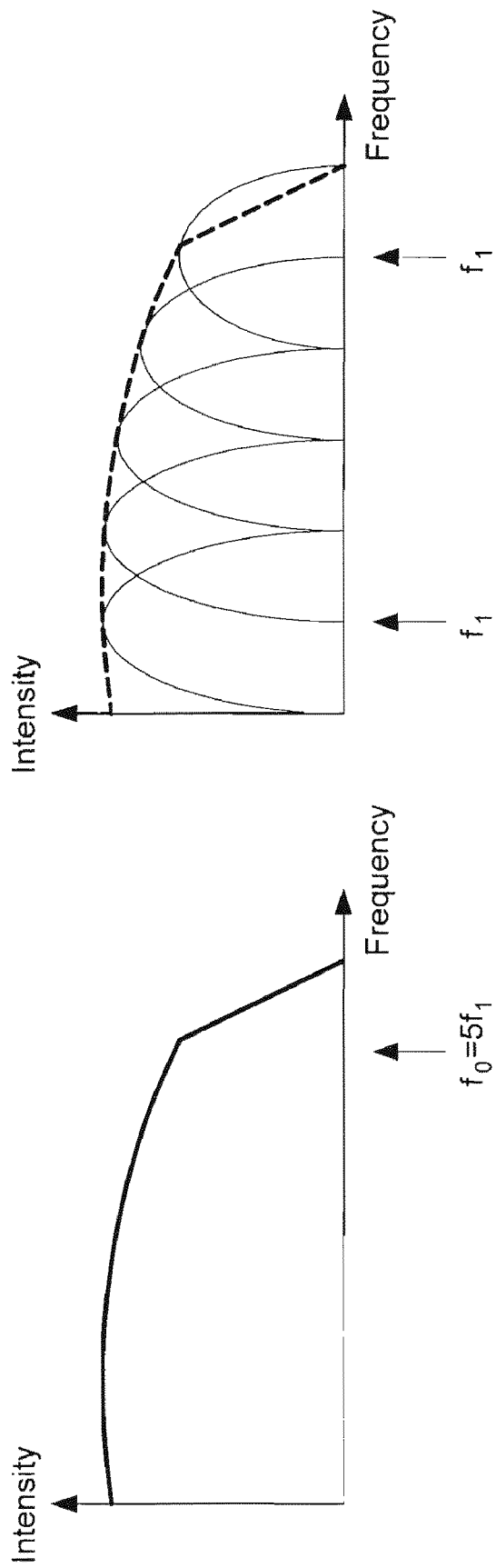
FIGS. 1A and 1B are schematic comparative views of a frequency spectrum distribution of a conventional direct transmission and an OFDM transmission.
Figure 2:
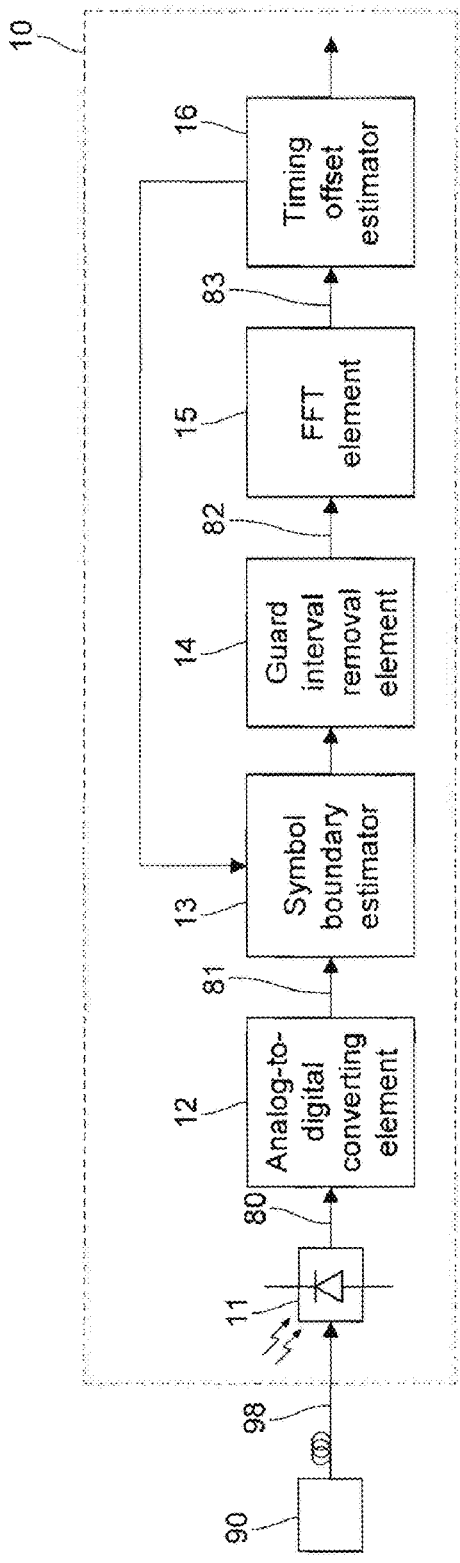
FIG. 2 is a schematic architectural view of a receiving end of an optical OFDM system according to the present invention.

FIG. 2 is a schematic architectural view of a receiving end of an optical OFDM system according to the present invention. Referring to FIG. 2, the signal receiving method of the present invention is applicable to an optical OFDM receiver 10. The receiver 10 receives an optical signal 98 emitted by an optical OFDM emitter 90. The receiver 10 comprises an optical-to-electrical converting element 11, an analog-to-digital converting element 12, a symbol boundary estimator 13, a guard interval removal element 14, an FFT element 15, and a timing offset estimator 16.

Figure 3:
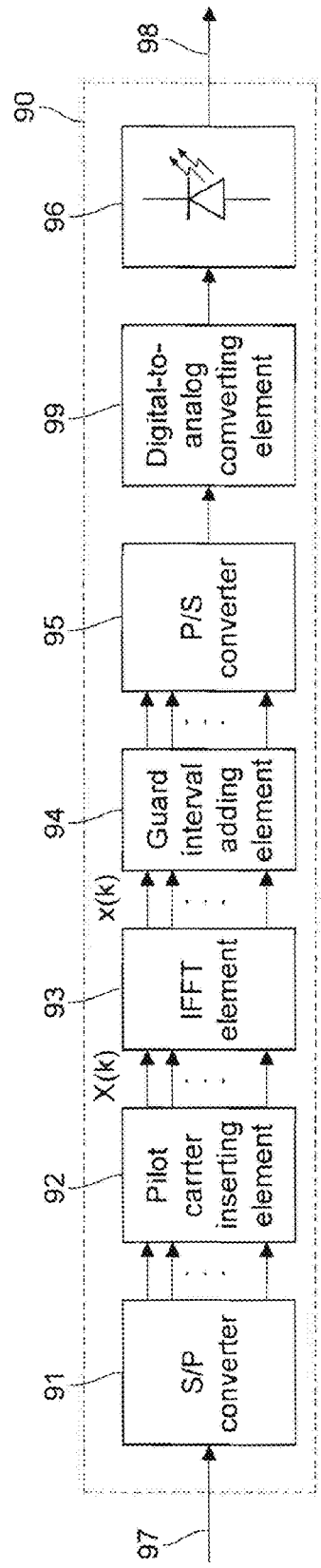
FIG. 3 is a schematic architectural view of an emitting end of the optical OFDM system according to the present invention.

The manner of generating the optical signal 98 by the emitter 90 can be obtained with reference to FIG. 3, and FIG. 3 is a schematic architectural view of an emitting end of the optical OFDM system according to the present invention. As shown in FIG. 3, the emitting end (that is, the emitter 90) comprises a serial to parallel (S/P) converter 91, a pilot carrier inserting element 92, an inverse FFT (IFFT) element 93, a guard interval adding element 94, a parallel to serial (P/S) converter 95, a digital-to-analog converting element 99, and an electrical-to-optical converting element 96.

The S/P converter 91 divides a sequence digital signal 97 to be transferred into a plurality of parallel digital signals, and converts each parallel digital signal into a plurality of parallel modulated digital signals in a QAM or PSK manner. The S/P converter 91 then transfers the parallel modulated digital signals to the pilot carrier inserting element 92. The parallel modulated digital signals all belong to the data to be transmitted, which are also called "data carrier signals". The pilot carrier inserting element 92 inserts/arranges the "pilot carrier signals" among the "data carrier signals" in an appropriate arrangement manner. The "data carrier signals" and the appropriately arranged "pilot carrier signals" are combined to form a plurality of parallel sub-carriers X(k), and such sub-carriers X(k) belong to frequency domain sub-carriers. That is to say, each sub-carrier X(k) comprises a plurality of "data carrier signals" and a plurality of "pilot carrier signals".

Figure 4:
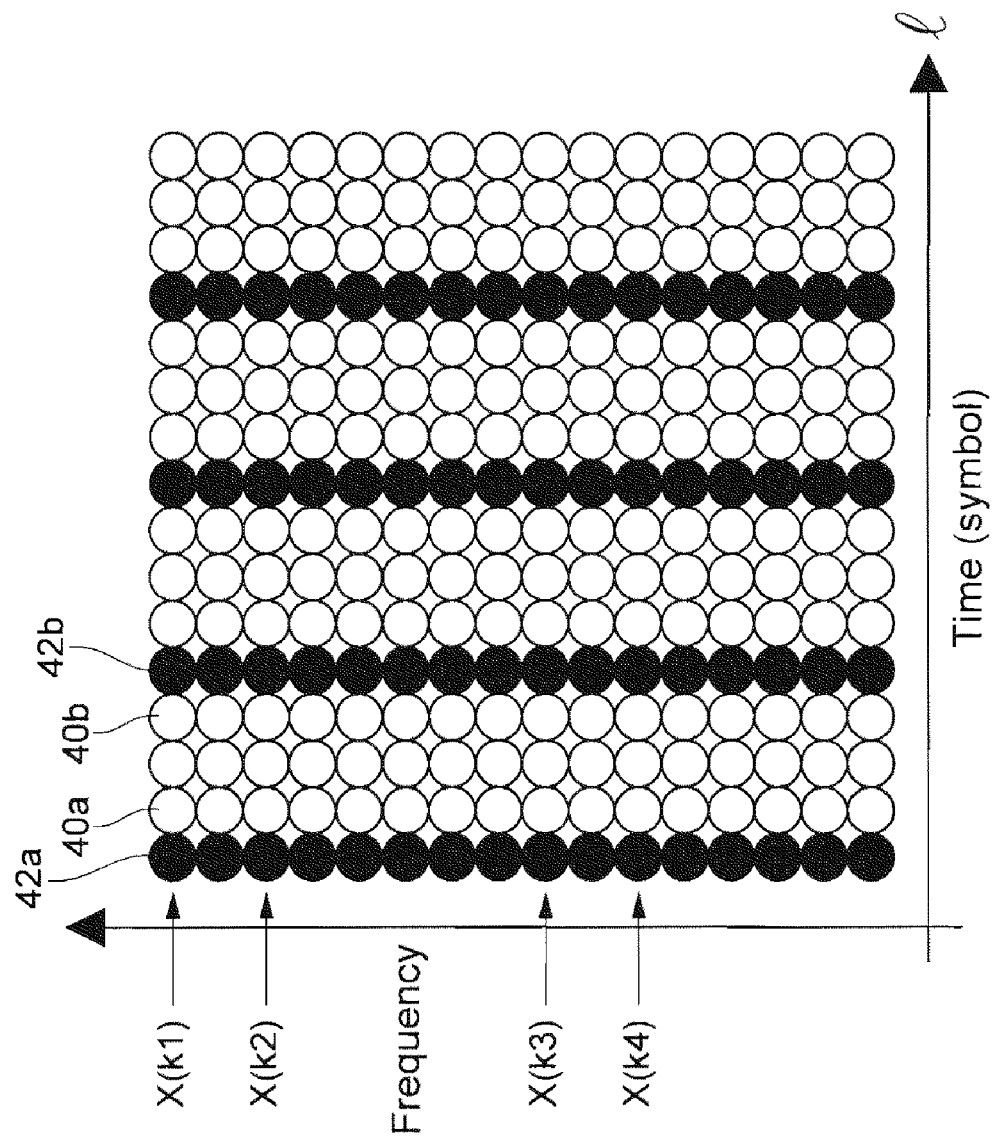
FIG. 4 is a schematic arrangement view of data carrier signals and pilot carrier signals in frequency domain sub-carriers X(k) of the emitter according to the present invention.

The manner of arranging the "pilot carrier signals" among the "data carrier signals" can be obtained with reference to FIG. 4, and FIG. 4 is a schematic arrangement view of the data carrier signals and the pilot carrier signals in sub-carriers X(k).

A basic time length unit for each "pilot carrier signal" and "data carrier signal" is defined as a symbol. The symbol is the minimum unit of the time length for converting the sequence signal into the analog signal. A transverse axis in FIG. 4 is a time axis, which takes the symbol as the unit and is represented by 1, and a longitudinal axis represents the frequency. It may be known from FIG. 4 that, each vertical column has 16 dots. The transverse axis corresponding to each dot on each vertical column is called one frequency domain sub-carrier X(k) (represented by X(k1), X(k2), X(k3), and X(k4) in the drawing). Each sub-carrier X(k) comprises a plurality of symbols. The symbols corresponding to the same sub-carrier X(k) comprise a plurality of data carrier signals 40a and 40b and a plurality of pilot carrier signals 42a and 42b. In the drawing, solid dots represent the pilot carrier signals 42a and 42b, and hollow dots represent the data carrier signals 40a and 40b.

The pilot carrier signals 42a and 42b corresponding to the same symbol period (that is, the same symbol time length) are respectively distributed on each frequency domain sub-carrier X(k). The same symbol period represents each unit of the symbol time length on the transverse axis. That is, the same column in the drawing is called the same symbol period here. Therefore, "the pilot carrier signals 42a and 42b corresponding to the same symbol period being respectively distributed on each frequency domain sub-carrier X(k)" means that all the symbols on the column corresponding to the pilot carrier signals 42a and 42b are the pilot carrier signals 42a and 42b, instead of data carrier signals 40a and 40b.

In addition, for example, in FIG. 4, on the same frequency domain sub-carrier X(k) (that is, the same transverse axis in the drawing), three data carrier signals 40a and 40b are located between each two pilot carrier signals 42a and 42b. The present invention is not limited thereto, and the number of data carrier signals 40a and 40b between each two pilot carrier signals 42a and 42b can be adjusted according to the system, which may be, but not limited to, 1, 2, 4, and 8.

Next, the frequency domain sub-carriers X(k) are converted into a plurality of time domain sub-carriers x(k) by the IFFT element 93. The plurality of time domain sub-carriers x(k) is mutually orthogonal. The IFFT size is equal to the number of the frequency domain sub-carriers. For example, in FIG. 4, the IFFT size is 16.

The guard interval adding element 94 adds a cyclic prefix before each symbol or adds a cyclic post-fix after each symbol.

The P/S converter 95 converts the time domain sub-carrier x(k) added with the guard interval into a serial signal and transfers the serial signal to the digital-to-analog converting element 99. The digital-to-analog converting element 99 converts the serial signal into an analog signal and transfers the analog signal to the electrical-to-optical converting element 96. The electrical-to-optical converting element 96 may be, but not limited to, a laser. The electrical-to-optical converting element 96 converts the analog signal into the optical signal 98, and transfers the optical signal 98 via the optical fiber.

Referring to FIG. 2, after receiving the optical signal 98, the optical-to-electrical converting element 11 converts the optical signal 98 into the analog signal 80. The optical-to-electrical converting element 11 may be, but not limited to, an optical receiver. The analog signal 80 is an electrical signal.

The analog-to-digital converting element 12 receives the analog signal 80 and converts the analog signal 80 into the digital signal 81. Next, the symbol boundary estimator 13 estimates the symbol boundary of the digital signal 81 and transfers an estimation result to the guard interval removal element 14. The guard interval removal element 14 removes the guard interval in the digital signal 81 according to the symbol boundary estimation result, so as to generate a digital electrical signal 82.

The FFT element 15 receives the electrical signal and converts the electrical signal into a plurality of frequency domain sub-carriers 83 in an FFT manner. The received frequency domain sub-carriers 83 have already been affected by the transmission medium (for example, optical fiber), system interference, or noises etc., so the frequency domain sub-carriers 83 are not the frequency domain sub-carriers X(k) at the emitting end (that is, the emitter 90), and thus, the received frequency domain sub-carriers 83 are represented by Y(k) here. The received frequency domain sub-carriers 83, Y(k), are described in detail thereafter.

The timing offset estimator 16 receives the frequency domain sub-carrier 83 and estimates a timing offset. Here, the timing offset is a residual timing offset, that is, the estimation timing offset error of the symbol boundary estimator 13. After the timing offset is obtained, the timing offset is transferred to the symbol boundary estimator 13, so as to compensate the symbol boundary estimator 13.

In addition to the frequency domain sub-carriers X(k) emitted by the emitter 90, the received frequency domain sub-carriers Y(k) further comprises the channel response and the noise. In the optical communication field, when an optical signal is transmitted in the optical fiber, the chromatic dispersion may occur. The chromatic dispersion produces the phase offset in the optical fiber channel. Different chromatic dispersion constants (or called as delay spread constant due to chromatic dispersion) respectively generate a different phase offset for each channel (each band or sub-carrier). Therefore, the received frequency domain sub-carriers Y(k) may be represented as:

$$Y_l(k) = \left(H'_l(k) \cdot e^{-j \cdot 2 \pi \frac{k \cdot (k + \frac{N}{2}) B}{N^2}}\right) \cdot e^{-j \cdot 2 \pi \frac{k \cdot \tau}{N}} \cdot X_l(k) + W_l(k). \quad (1)$$

In Equation (1), l is a symbol number (that is, a first symbol); N is an FFT size; k is a sub-carrier number (that is, the $k^{th}$ sub-carrier); K is an integer within a scope of $-N/2 \leq k < (N/2) - 1$; $Y_l(k)$ is a signal of the $k^{th}$ sub-carrier of the first symbol after the FFT is calculated; $H'_l(k)$ is a multi-path channel response of the $k^{th}$ sub-carrier of the first symbol; B is a chromatic dispersion constant; τ is a residual timing offset; $X_l(k)$ is a transferred signal of the $k^{th}$ sub-carrier of the first symbol, which may be a data carrier signal or a pilot carrier signal;

$$\left(H'_l(k) \cdot e^{-j \cdot 2\pi \frac{k \cdot (k + \frac{N}{2})B}{N}}\right)$$

is an integrated channel response of the $k^{th}$ sub-carrier of the first symbol, comprising the channel response generated by the chromatic dispersion and the multi-path channel response; and $W_l(k)$ is the noise of the $k^{th}$ sub-carrier of the first symbol.

Figure 5:
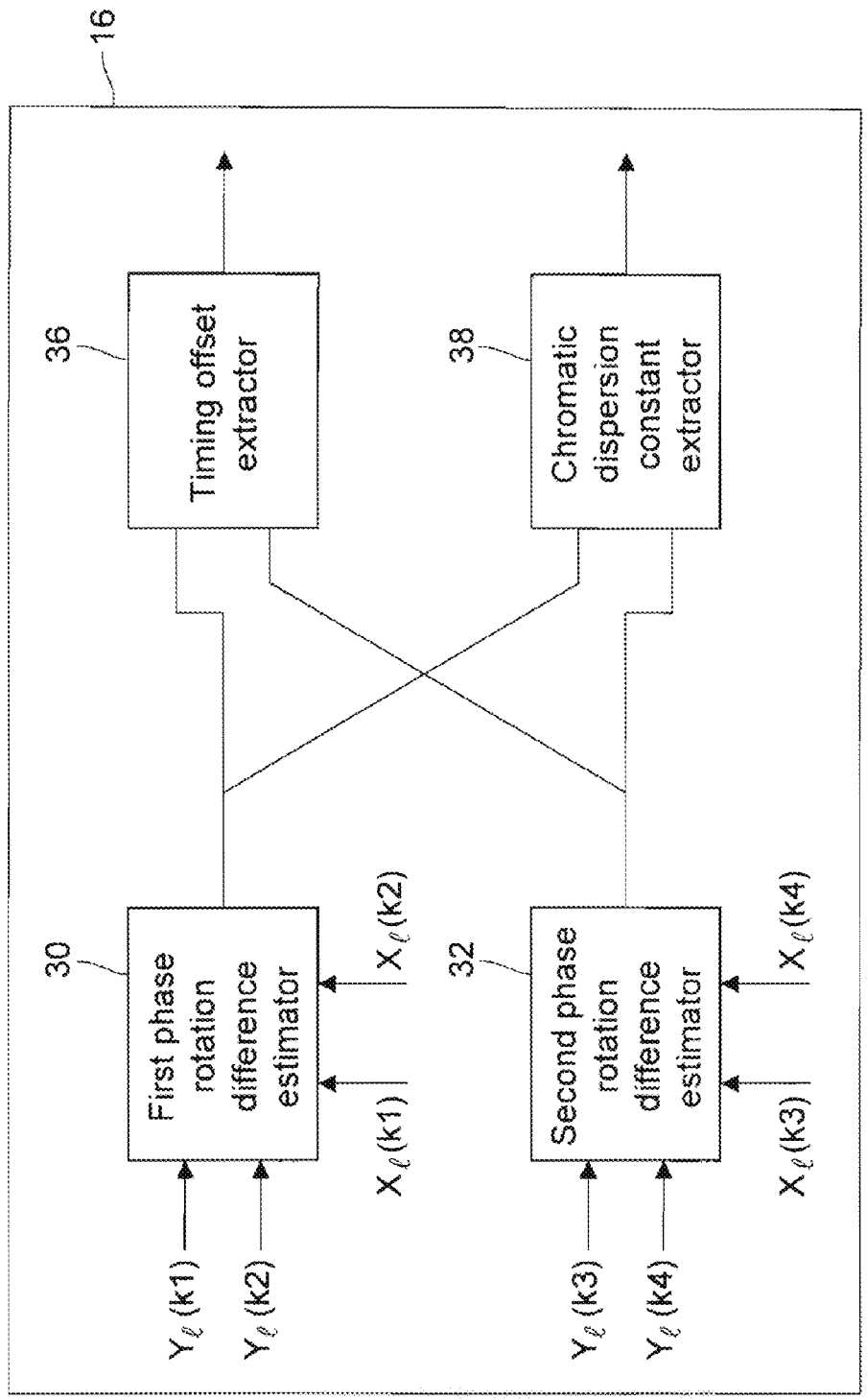
FIG. 5 is a schematic block circuit diagram of a timing offset estimator according to the present invention.

FIG. 5 is a schematic block circuit diagram of the timing offset estimator 16. As known from FIG. 5 that, the timing offset estimator 16 comprises a first phase rotation difference estimator 30, a second phase rotation difference estimator 32, a timing offset extractor 36, and a chromatic dispersion constant extractor 38.

The timing offset estimator 16 estimates the timing offset by using the received frequency domain sub-carriers Y(k). Each symbol and each channel (sub-carrier) are estimated. The pilot carrier signals in the frequency domain sub-carriers X(k) emitted by the emitter 90 are predetermined, that is, the receiving end (that is, the receiver 10) knows the content of each pilot carrier signal in advance. Therefore, the timing offset estimator 16 performs the estimation by using the frequency domain sub-carriers Y(k) of the symbol period corresponding to the pilot carrier signals. Taking FIG. 4 for example, each emitted frequency domain sub-carrier X(k) on the column of the pilot carrier signals 42a and 42b are known by the receiving end (that is, the receiver 10). In the following descriptions, X(k1), X(k2), X(k3), and X(k4) respectively represent the pilot carrier signals on the $k1^{th}$, $k2^{th}$, $k3^{th}$, and $k4^{th}$ sub-carriers (bands).

In the Equation (1), $Y_l(k)$ is the signal of the $k^{th}$ sub-carrier of the first symbol after the FFT is performed. The noise $W_l(k)$ is a thermal effect of the system hardware or an environmental noise, which is not easily changed due to different symbols and different sub-carriers (channels). Under a situation that the noises are not large, the noises may be omitted for the ease of calculation during the timing offset estimation.

The first phase rotation difference estimator 30 estimates a first phase rotation difference angle (E(k2,k1)) with two pilot carrier signals X(k1) and X(k2) and two corresponding frequency domain sub-carriers Y(k1) and Y(k2). The first phase rotation difference estimator 30 performs a complex-conjugate multiplication on $$\frac{Y(k2)}{X(k2)} \text{ and } \frac{Y(k1)}{X(k1)},$$

and obtains an angle thereof, so as to obtain the first phase rotation difference angle (E(k2,k1)), in which $$\frac{Y(k2)}{X(k2)} \text{ and } \frac{Y(k1)}{X(k1)}$$

are respectively channel responses of k1 and k2. The equation for estimating the first phase rotation difference angle (E(k2, k1)) is shown in Equation (2):

$$\text{angle}(E(k2, k1)) \cong \text{angle}\left(\text{conj}\left(\frac{Y(k2)}{X(k2)}\right) \cdot \frac{Y(k1)}{X(k1)}\right) \quad (2)$$

The second phase rotation difference estimator 32 estimates a second phase rotation difference angle (E(k4,k3)) with another two pilot carrier signals X(k3) and X(k4) and corresponding frequency domain sub-carriers Y(k3) and Y(k4). The second phase rotation difference estimator 32 performs the complex-conjugate multiplication on $$\frac{Y(k4)}{X(k4)} \text{ and } \frac{Y(k3)}{X(k3)},$$

and obtains an angle thereof, so as to obtain the second phase rotation difference angle (E(k4,k3)), in which $$\frac{Y(k4)}{X(k4)} \text{ and } \frac{Y(k3)}{X(k3)},$$

are respectively channel responses of k3 and k4. The equation for estimating the second phase rotation difference angle (E(k4,k3)) is shown in Equation (3):

$$\text{angle}(E(k3, k4)) \cong \text{angle}\left(\text{conj}\left(\frac{Y(k4)}{X(k4)}\right) \cdot \frac{Y(k3)}{X(k3)}\right) \quad (3)$$

After the estimations performed by the first phase rotation difference estimator 30 and the second phase rotation difference estimator 32, the values of the first and second phase rotation differences are obtained. The relations among the two phase rotation differences, the timing offset, and the chromatic dispersion constant may be derived from Equation (1), which is described as follows.

Taking the estimation of the first phase rotation difference for example, according to Equation (1), the signal of the $k1^{th}$ sub-carrier of the first symbol (Equation (4)) after the FFT is performed, and the signal of the $k2^{th}$ sub-carrier of the first symbol (Equation (5)) after the FFT is performed are respectively represented as:

$$Y_l(k1) = \left(H'_l(k1) \cdot e^{-j \cdot 2\pi \frac{k1 \cdot (k1 + \frac{N}{2})B}{N}}\right) \cdot e^{-j \cdot 2\pi \frac{k1 \cdot \tau}{N}} \cdot X_l(k1) + W_l(k1) \quad (4)$$

$$Y_l(k2) = \left(H'_l(k2) \cdot e^{-j \cdot 2\pi \frac{k2 \cdot (k2 + \frac{N}{2})B}{N}}\right) \cdot e^{-j \cdot 2\pi \frac{k2 \cdot \tau}{N}} \cdot X_l(k2) + W_l(k2) \quad (5)$$

In which $-N/2 \leq k1 < (N/2)-1$ and $-N/2 \leq k2 < (N/2)-1$.

As described above, in order to simplify the equations, the noises are omitted. The result of performing the complex-conjugate multiplication on $$\left(\frac{Y(k2)}{X(k2)}\right) \text{ and } \left(\frac{Y(k1)}{X(k1)}\right),$$

and obtaining the angle thereof is shown in Equation (6) as follows:

$$\text{angle}(E(k2, k1)) \cong \text{angle}\left(\text{conj}\left(\frac{Y(k2)}{X(k2)}\right) \cdot \left(\frac{Y(k1)}{X(k1)}\right)\right) \quad (6)$$

In Equation (6), E(k2,k1) is a product of the complexes on a complex plane, and the algorithm equation is as follows:

$$E(k2, k1)) = conj\left(\frac{Y(k2)}{X(k2)}\right) \cdot \left(\frac{Y(k1)}{X(k1)}\right) \quad (7)$$

$$= conj\left(H'_l(k2) \cdot e^{-j \cdot 2\pi \frac{k2 \cdot (k2 + \frac{N}{2})B}{N}} \cdot e^{-j \cdot 2\pi \frac{k2 \cdot \tau}{N}}\right) \cdot$$

$$\left(H'_l(k1) \cdot e^{-j \cdot 2\pi \frac{k1 \cdot (k1 + \frac{N}{2})B}{N}} \cdot e^{-j \cdot 2\pi \frac{k1 \cdot \tau}{N}}\right)$$

$$= conj(H'_l(k2)) \cdot H'_l(k1) \cdot e^{j \cdot 2\pi \frac{(k2-k1)\tau}{N}} \cdot$$

$$e^{j \cdot 2\pi \frac{[k2 \cdot (k2 + \frac{N}{2}) - k1 \cdot (k1 + \frac{N}{2})]B}{N}}$$

Next, based on Equation (7), the angle is calculated, so as to obtain an Equation (8):

$$\text{angle}(E(k2, k1)) \cong \frac{2 \cdot \pi}{N} \left\{ \Delta k \cdot \tau + \left[k2 \cdot \left(k2 + \frac{N}{2}\right) - k1 \cdot \left(k1 + \frac{N}{2}\right)\right] \cdot B \right\} \quad (8)$$

In which $\Delta k = k2 - k1$

Through the derivation manner similar to Equations (4)-(8), the relation equation among the second phase rotation difference, the timing offset, and the chromatic dispersion constant is obtained, for example, Equation (9) as follows:

$$\text{angle}(E(k4, k3)) \cong \frac{2 \cdot \pi}{N} \left\{ \Delta k \cdot \tau + \left[k4 \cdot \left(k4 + \frac{N}{2}\right) - k3 \cdot \left(k3 + \frac{N}{2}\right)\right] \cdot B \right\} \quad (9)$$

In which $\Delta k = k4 - k3$ angle (E(k2,k1)), and angle (E(k4,k3)) are known. Therefore, through the algorithm of Equations (8)-(9), the timing offset τ is obtained based on Equation (10) as follows:

$$\frac{\left[k4 \cdot \left(k4 + \frac{N}{2}\right) - k3 \cdot \left(k3 + \frac{N}{2}\right)\right] \cdot \frac{N}{2 \cdot \pi} \cdot \text{angle}(E(k2, k1)) -}{\left\{\left[k4 \cdot \left(k4 + \frac{N}{2}\right) - k3 \cdot \left(k3 + \frac{N}{2}\right)\right] - \right.} = \quad (10)$$

$$\left[k2 \cdot \left(k2 + \frac{N}{2}\right) - k1 \cdot \left(k1 + \frac{N}{2}\right)\right] \cdot \Delta k$$

$$\frac{\left[k4 \cdot \left(k4 + \frac{N}{2}\right) - k3 \cdot \left(k3 + \frac{N}{2}\right)\right] \cdot \frac{N}{2 \cdot \pi} \cdot \text{angle}(E(k2, k1))}{\left\{\left[k4 \cdot \left(k4 + \frac{N}{2}\right) - k3 \cdot \left(k3 + \frac{N}{2}\right)\right] - \right.} -$$

$$\left[k2 \cdot \left(k2 + \frac{N}{2}\right) - k1 \cdot \left(k1 + \frac{N}{2}\right)\right] \cdot \Delta k$$

$$\frac{\left[k2 \cdot \left(k2 + \frac{N}{2}\right) - k1 \cdot \left(k1 + \frac{N}{2}\right)\right] \cdot \frac{N}{2 \cdot \pi} \cdot \text{angle}(E(k4, k3))}{\left\{\left[k4 \cdot \left(k4 + \frac{N}{2}\right) - k3 \cdot \left(k3 + \frac{N}{2}\right)\right] - \right.}$$

$$\left[k2 \cdot \left(k2 + \frac{N}{2}\right) - k1 \cdot \left(k1 + \frac{N}{2}\right)\right] \cdot \Delta k$$

In Equation (10), k1, k2, k3, and k4 are integers greater than or equal to −N/2 and smaller than (N/2)−1, N is an FFT size, k2>k1, k4>k3, and Δk=k2−k1=k4−k3.

The timing offset extractor 36 estimates the timing offset τ according to the first phase rotation difference and the second phase rotation difference. The timing offset extractor 36 substitutes the first phase rotation difference angle (E(k2,k1)) and the second phase rotation difference angle (E(k4,k3)) into Equation (10), so as to estimate the timing offset value.

Figure 6:
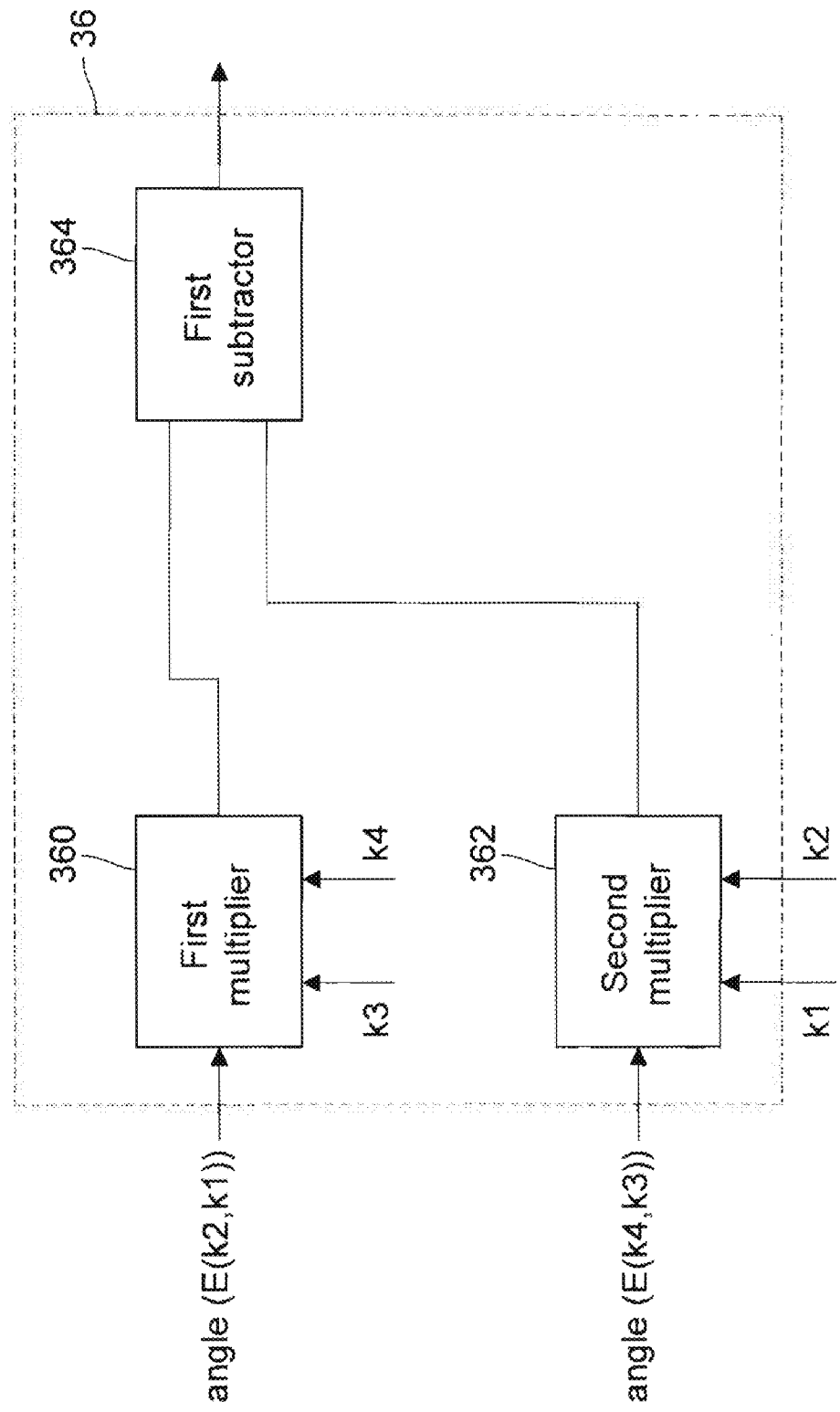
FIG. 6 is a schematic block circuit diagram of a timing offset extractor according to the present invention.

FIG. 6 is a block circuit diagram of the timing offset extractor 36. Referring to FIG. 6, it may be known that, the timing offset extractor 36 comprises a first multiplier 360, a second multiplier 362, and a first subtractor 364. The first multiplier 360 calculates the foresection of Equation (10) (that is, the equation before the minus sign). The second multiplier 362 calculates the aftersection of Equation (10) (that is, the equation after the minus sign). The first subtractor 364 subtracts the output of the second multiplier 362 from the output of the first multiplier 360, so as to obtain the result of Equation (10). The k1, k2, k3, and k4, the angle (E(k2,k1)), and the angle (E(k4,k3)) are known, so the value calculated by the subtractor 364 is the timing offset τ.

The timing offset τ obtained by estimation is the residual timing offset, so that the symbol boundary estimator 13 is compensated with the timing offset τ (referring to FIG. 2). Therefore, the symbol boundary estimator 13 more accurately estimates the symbol boundary of the next symbol, and the guard interval removal element 14 more accurately removes the guard interval in the digital signal 81.

The chromatic dispersion constant B is estimated by the chromatic dispersion constant extractor 38. The chromatic dispersion constant B is estimated according to the first phase rotation difference and the second phase rotation difference. Similarly, after the algorithm is performed by using Equations (8)-(9), the chromatic dispersion constant B is obtained based on Equation (11) as follows:

$$B \cong \frac{\frac{N}{2 \cdot \pi} \cdot [\text{angle}(E(k4, k3)) - \text{angle}(E(k2, k1))]}{\left[k4 \cdot \left(k4 + \frac{N}{2}\right) - k3 \cdot \left(k3 + \frac{N}{2}\right)\right] -} \cong \quad (11)$$

$$\left[k2 \cdot \left(k2 + \frac{N}{2}\right) - k1 \cdot \left(k1 + \frac{N}{2}\right)\right]$$

$$\frac{\frac{N}{2 \cdot \pi} \cdot [\text{angle}(E(k4, k3))]}{\left[k4 \cdot \left(k4 + \frac{N}{2}\right) - k3 \cdot \left(k3 + \frac{N}{2}\right)\right] -} -$$

$$\left[k2 \cdot \left(k2 + \frac{N}{2}\right) - k1 \cdot \left(k1 + \frac{N}{2}\right)\right]$$

$$\frac{\frac{N}{2 \cdot \pi} \cdot [\text{angle}(E(k2, k1))]}{\left[k4 \cdot \left(k4 + \frac{N}{2}\right) - k3 \cdot \left(k3 + \frac{N}{2}\right)\right] -}$$

$$\left[k2 \cdot \left(k2 + \frac{N}{2}\right) - k1 \cdot \left(k1 + \frac{N}{2}\right)\right]$$

Figure 7:
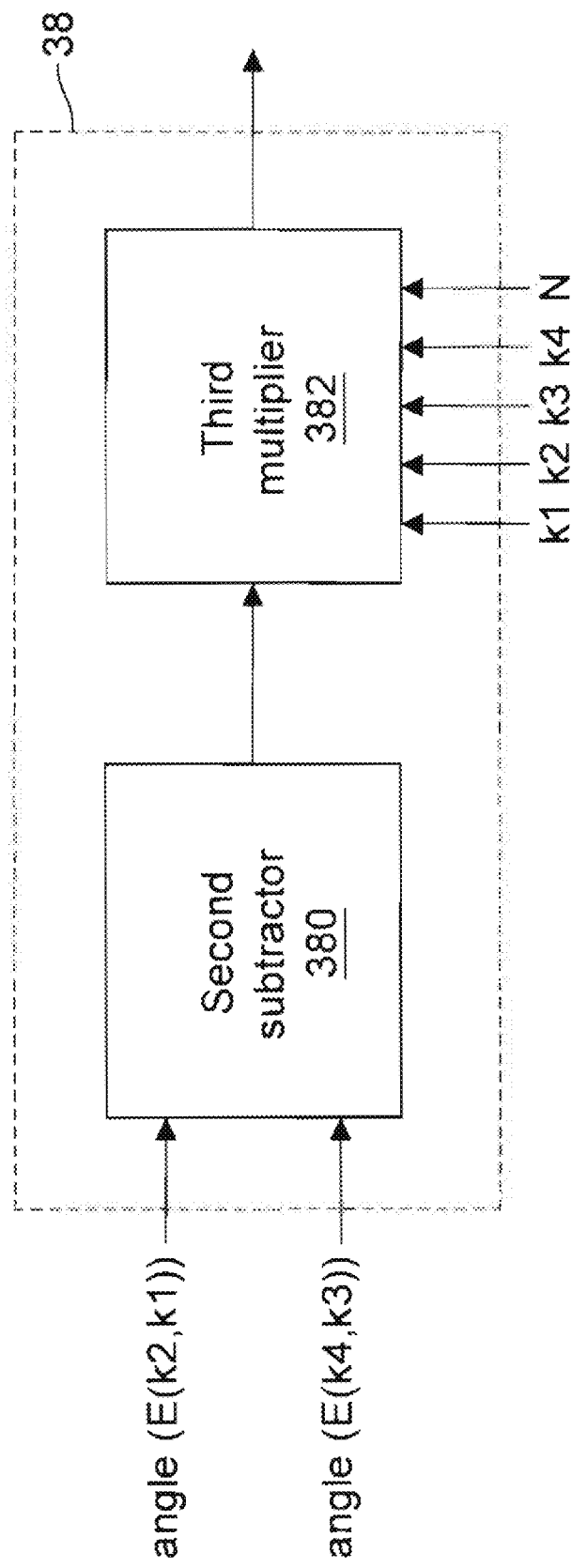
FIG. 7 is a schematic block circuit diagram of a chromatic dispersion constant extractor according to the present invention.

FIG. 7 is a schematic block circuit diagram of the chromatic dispersion constant extractor 38. Referring to FIG. 7, it may be known that, the chromatic dispersion constant extractor 38 comprises a second subtractor 380 and a third multiplier 382. The subtractor 380 subtracts the angle (E(k4, k3)) in Equation (11) from the angle (E(k2, k1)) in Equation (11). The third multiplier 382 multiplies the subtraction result of the subtractor 380 by $$\frac{\frac{N}{2 \cdot \pi}}{\left[k4 \cdot \left(k4 + \frac{N}{2}\right) - k3 \cdot \left(k3 + \frac{N}{2}\right) - k2 \cdot \left(k2 + \frac{N}{2}\right) - k1 \cdot \left(k1 + \frac{N}{2}\right)\right]},$$

so as to obtain the chromatic dispersion constant B.

The chromatic dispersion constant B is taken as a reference for determining the length of the guard interval. That is, the multi-channel effect in the optical communication is not distinct, the phenomenon resulted from the chromatic dispersion relatively approaches the phenomenon generated by the multi-channel effect. Therefore, after the chromatic dispersion constant B is estimated, the length of the guard interval (the cyclic prefix or the cyclic post-fix) required to be added to each symbol may be more appropriately determined. In this manner, the similar multi-channel effect problem resulted from failing to estimate the chromatic dispersion can be avoided, so that the length of the guard interval may not be unnecessarily increased, and the bandwidth used for data transmission may not be reduced. That is to say, by correctly estimating the chromatic dispersion constant, the bandwidth is more effectively applied to transmit the data, and the excessive guard interval is reduced.

Although the timing offset estimator 16 comprises the chromatic dispersion constant extractor 38, the chromatic dispersion constant extractor 38 may be removed, such that the timing offset estimator 16 only comprises the first phase rotation difference estimator 30, the second phase rotation difference estimator 32, and the timing offset extractor 36, which may also achieve the objectives of the present invention.

Although k1, k2, k3, and k4 have different names, it does not mean that the present invention can only be finished by at least four frequency domain sub-carriers Y(k1), Y(k2), Y(k3), and Y(k4) and four corresponding pilot carrier signals X(k1), X(k2), X(k3), and X(k4). In the present invention, it may set that k3=k2, and the other conditions remain unchanged. In this manner, the timing offset and the chromatic dispersion constant may be estimated by using three frequency domain sub-carriers Y(k1), Y(k2), Y(k3), and Y(k4) and three corresponding pilot carrier signals X(k1), X(k2), X(k3), and X(k4). In addition, the objectives of the present invention may also be achieved by adopting more frequency domain sub-carriers and pilot carrier signals.

Figure 8:
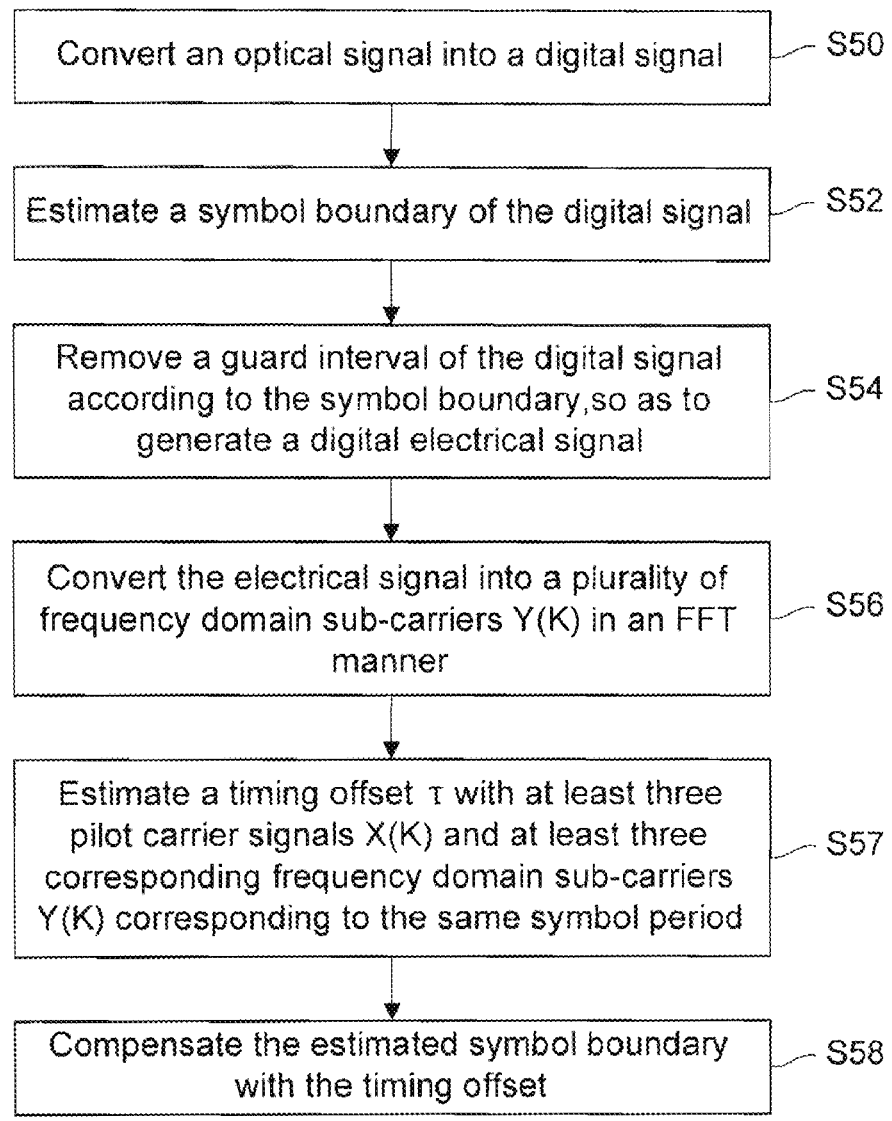
FIG. 8 is a schematic flow chart of a method for receiving an optical OFDM signal according to the present invention.

For the structure of the receiving end in the optical OFDM system according to the present invention, the present invention further provides a method for receiving an optical OFDM signal according to the present invention. Referring to FIG. 8, the receiving method is applicable to an optical OFDM receiver, and the receiver receives an optical signal emitted by an optical OFDM emitter. The receiving method comprises the steps as follows.

In Step S50, the optical signal is converted into a digital signal.

In Step S52, a symbol boundary of the digital signal is estimated.

In Step S54, a guard interval of the digital signal is removed according to the symbol boundary, so as to generate a digital electrical signal.

In Step S56, the electrical signal is converted into a plurality of frequency domain sub-carriers Y(k) in an FFT manner, in which each frequency domain sub-carrier comprises a plurality of symbols, the symbols corresponding to the same frequency domain sub-carrier comprise a plurality of data carrier signals and pilot carrier signals, and the pilot carrier signals X(k) are located in the same symbol period, in which k is an integer greater than or equal to −N/2 and smaller than (N/2)−1, and N is an FFT size.

In Step S57, a timing offset τ is estimated with at least three pilot carrier signals X(k) and at least three corresponding frequency domain sub-carriers Y(k) corresponding to the same symbol period (four pilot carrier signals X(k) and four frequency domain sub-carriers Y(k) are taken as an example below).

In Step S58, the estimated symbol boundary is compensated with the timing offset, that is, the symbol boundary of the digital signal estimated in Step S52 is compensated.

Figure 9:
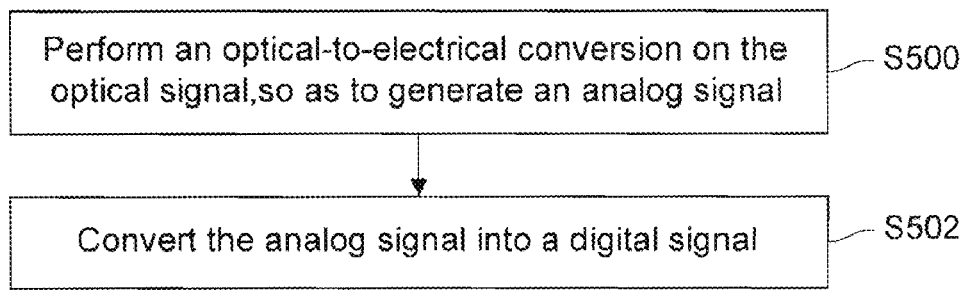
FIG. 9 is a schematic flow chart of Step S50 in the method for receiving the optical OFDM signal according to the present invention.

Step S50 is finished by the optical-to-electrical converting element 11 and the analog-to-digital converting element 12 in FIG. 2. That is to say, Step S50 further comprises the following processes (referring to FIG. 9 at the same time).

In Step S500, an optical-to-electrical conversion is performed on the optical signal, so as to generate an analog signal.

In Step S502, the analog signal is converted into a digital signal.

Step S500 is performed by the optical-to-electrical converting element 11, and Step S502 is finished by the analog-to-digital converting element 12.

The estimation of the symbol boundary of the digital signal in Step S52 is performed by the symbol boundary estimator 13. The process of removing the guard interval of the digital signal according to the symbol boundary to generate a digital electrical signal in Step S54 is executed by the guard interval removal element 14. The process of converting the electrical signal into the plurality of frequency domain sub-carriers Y(k) in the FFT manner in Step S56 is finished by the FFT element 15. The process of estimating the timing offset τ with at least three pilot carrier signals X(k) and at least three corresponding frequency domain sub-carriers Y(k) corresponding to the same symbol period in Step S57 is performed by the timing offset estimator 16.

After the timing offset value is obtained, Step S52 is compensated with the timing offset value, which is the above-mentioned Step S58. That is to say, in Step S52 of estimating the symbol boundary of the digital signal, the symbol boundary of the digital signal is compensated and estimated according to the timing offset.

Figure 10:
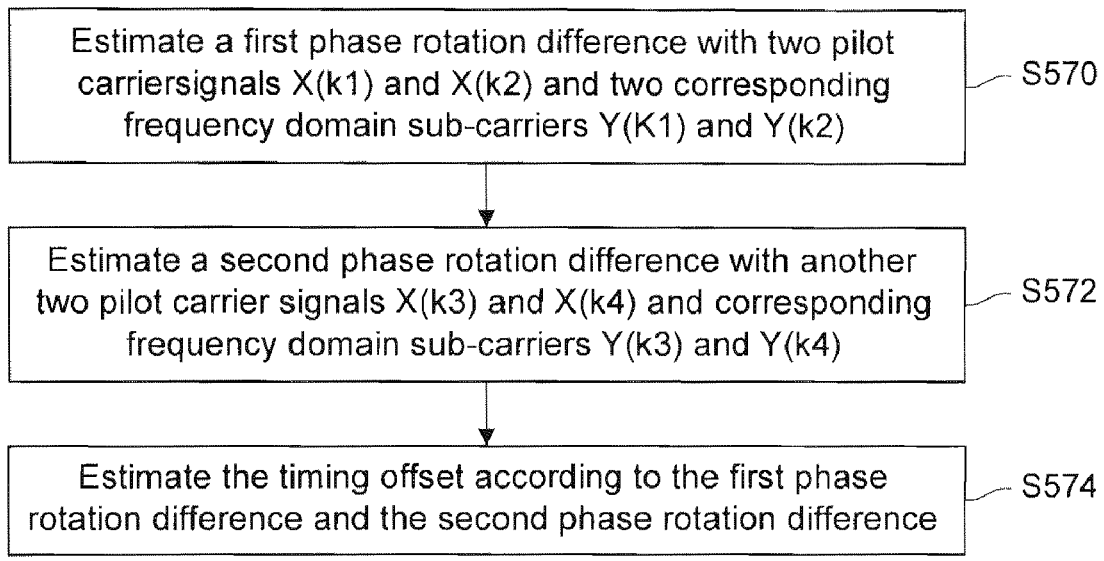
FIG. 10 is a schematic flow chart of Step S57 in the method for receiving the optical OFDM signal according to the present invention.

Referring to FIG. 10, Step S57 comprises the processes as follows.

In Step S570, a first phase rotation difference is estimated with two pilot carrier signals X(k1) and X(k2) and two corresponding frequency domain sub-carriers Y(k1) and Y(k2).

In S572, a second phase rotation difference is estimated with another two pilot carrier signals X(k3) and X(k4) and corresponding frequency domain sub-carriers Y(k3) and Y(k4).

In S574, the timing offset is estimated according to the first phase rotation difference and the second phase rotation difference.

k1, k2, k3, and k4 are integers greater than or equal to −N/2 and smaller than (N/2)−1, N is an FFT size, k2>k1, k4>k3, and k2−k1=k4−k3.

The first phase rotation difference of Step S570 is obtained based on the above Equation (6) and is represented as:

$$\text{angle}(E(k2, k1)) \cong \text{angle}\left(\text{conj}\left(\frac{Y(k2)}{X(k2)}\right) \cdot \left(\frac{Y(k1)}{X(k1)}\right)\right).$$

The second phase rotation difference of Step S572 is represented as:

$$\text{angle}(E(k2, k1)) \cong \text{angle}\left(\text{conj}\left(\frac{Y(k2)}{X(k2)}\right) \cdot \left(\frac{Y(k1)}{X(k1)}\right)\right).$$

According to the algorithm manner of Equations (1) to (11), the timing offset may be estimated to be:

$$\frac{\left[k4 \cdot \left(k4 + \frac{N}{2}\right) - k3 \cdot \left(k3 + \frac{N}{2}\right)\right] \cdot \frac{N}{2 \cdot \pi} \cdot \text{angle}(E(k2, k1)) - \left[k2 \cdot \left(k2 + \frac{N}{2}\right) - k1 \cdot \left(k1 + \frac{N}{2}\right)\right] \cdot \frac{N}{2 \cdot \pi} \cdot \text{angle}(E(k4, k3))}{\left\{\left[k4 \cdot \left(k4 + \frac{N}{2}\right) - k3 \cdot \left(k3 + \frac{N}{2}\right)\right] - \left[k2 \cdot \left(k2 + \frac{N}{2}\right) - k1 \cdot \left(k1 + \frac{N}{2}\right)\right]\right\} \cdot \Delta k}.$$

In the above equation, angle (E(k2,k1)) is the first phase rotation difference, angle (E(k4,k3)) is the second phase rotation difference, conjis represents a complex-conjugate multiplication, N is the FFT size, Δk=k2−k1=k4−k3 Y(k1), Y(k2), Y(k3), and Y(k4) are respectively frequency domain sub-carriers of k1, k2, k3, and k4 corresponding to the symbol period, and X(k1), X(k2), X(k3), and X(k4) are respectively pilot carrier signals of k1, k2, k3, and k4 corresponding to the symbol period.

Step S57 of estimating the timing offset τ with at least three pilot carrier signals X(k) and at least three corresponding frequency domain sub-carriers Y(k) corresponding to the same symbol period further comprises estimating a chromatic dispersion constant B according to the first phase rotation difference and the second phase rotation difference. The chromatic dispersion constant is:

$$B \cong \frac{\frac{N}{2 \cdot \pi} \cdot [\text{angle}(E(k4, k3)) - \text{angle}(E(k2, k1))]}{\left[k4 \cdot \left(k4 + \frac{N}{2}\right) - k3 \cdot \left(k3 + \frac{N}{2}\right)\right] - \left[k2 \cdot \left(k2 + \frac{N}{2}\right) - k1 \cdot \left(k1 + \frac{N}{2}\right)\right]}.$$

In the above equation, angle (E(k2,k1)) is the first phase rotation difference, angle (E(k4,k3)) is the second phase rotation difference, N is the FFT size, and Δk=k2−k1=k4−k3

The method for receiving an optical OFDM signal further comprises the steps as follows.

Figure 11:
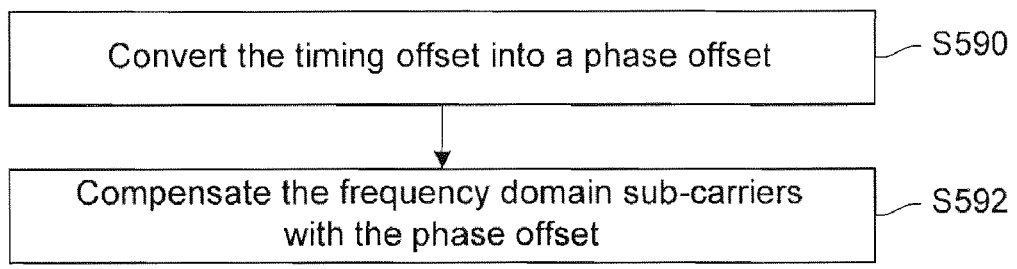
FIG. 11 is a schematic flow chart of Step S59 in the method for receiving the optical OFDM signal according to the present invention.

In Step S59, the frequency domain sub-carriers are compensated with the timing offset. That is to say, the frequency domain sub-carriers Y(k) on which the channel estimation is performed are compensated with the timing offset. Referring to FIG. 11, Step S59 further comprises the following processes.

In Step S590, the timing offset is converted into a phase offset.

In Step S592, the frequency domain sub-carriers are compensated with the phase offset.

After Step S592, the phase rotation generated from the timing offset has been compensated in the compensated frequency domain sub-carriers Y(k), and the frequency domain sub-carriers Y(k) are transferred to an equalizer for the subsequent operations.

Figure 12:
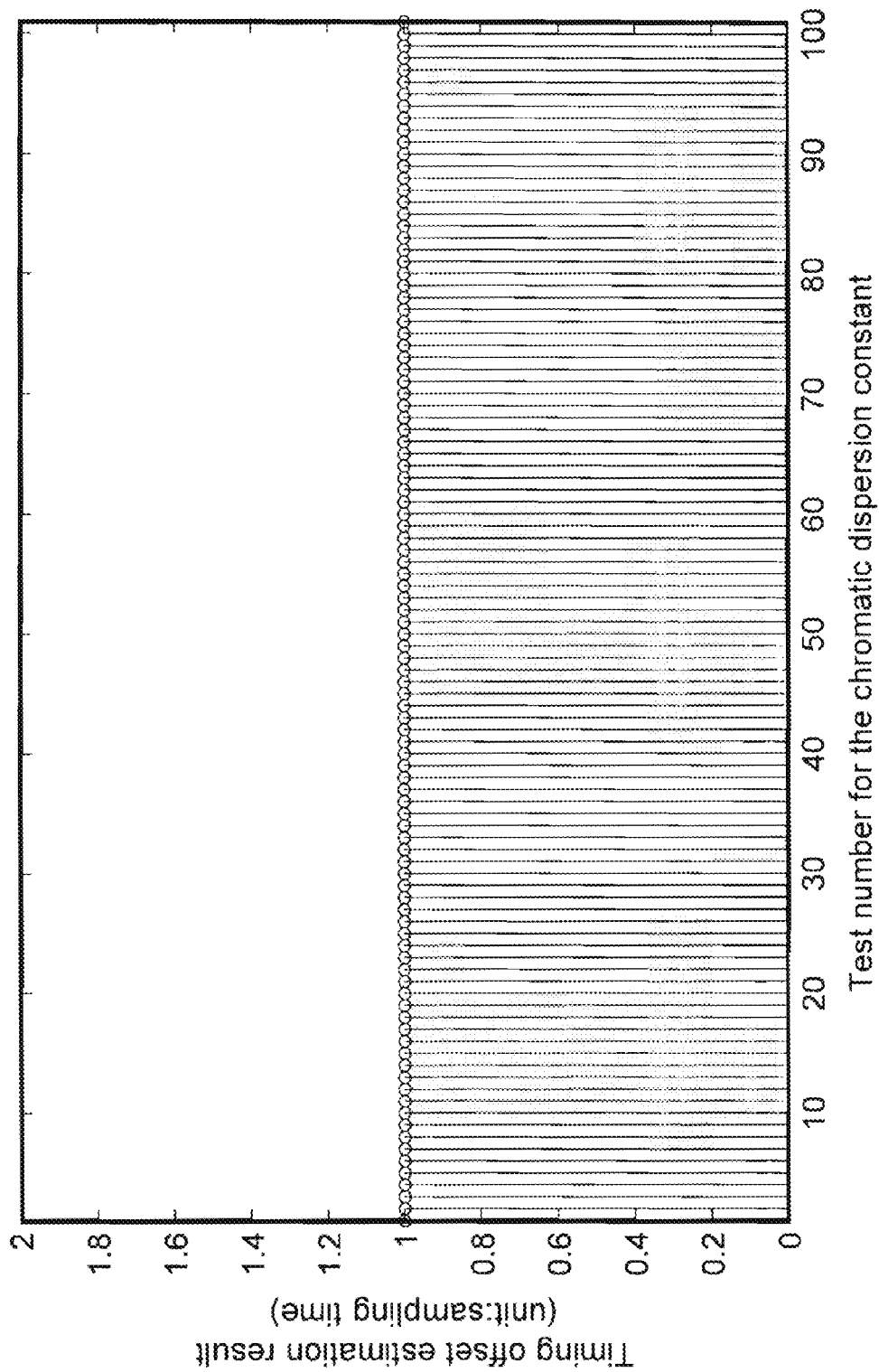
FIG. 12 is a schematic view of a timing offset estimation result tested by a receiver of an optical OFDM system according to the present invention.

According to the receiver 10 of the optical OFDM system and the receiving method according to the present invention, a test is performed. FIG. 12 is a schematic view of a timing offset estimation result tested by the receiver of the optical OFDM system according to the present invention. Referring to FIG. 12, in the test, a known timing offset amount is added to the receiving end on purpose. In this test example, the timing offset amount of one sampling clock (represented by Ts thereafter) is added. As for the transmission rate of 10 GS/s ($10 \times 10^9$ samples are transferred per second), each sampling interval occupies 0.1 ns ($10^{-9}$ second). If one symbol occupies 128 sampling points, each symbol period is 12.8 ns. In this test example, an optical communication system with different chromatic dispersion constants are used for testing, and the chromatic dispersion values are respectively 0 TS, 0.002 Ts, 0.004 Ts . . . 0.2 Ts. The setting contents include B=0 Ts corresponding to the transverse axis numbered as 0 in FIG. 12, B=0.002 Ts corresponding to the one numbered as 1, B=0.004 Ts corresponding to the one numbered as 2, B=0.006 Ts corresponding to the one numbered as 3, and so forth, and B=0.2 Ts corresponding to the one numbered as 100.

The transverse axis of FIG. 12 represents the test numbers for the predetermined chromatic dispersion constant, and so forth. The longitudinal axis represents the estimated timing offset value. As clearly known from the drawing that, under different chromatic dispersion constants, the timing offset estimation result is the set length of one sampling clock simulated by the receiving end. Although the effects of the noises and the channel response of the optical fiber still exist, the resulted error is rather small, without affecting the estimation result, so that the estimation result is quite accurate.

Figure 13:
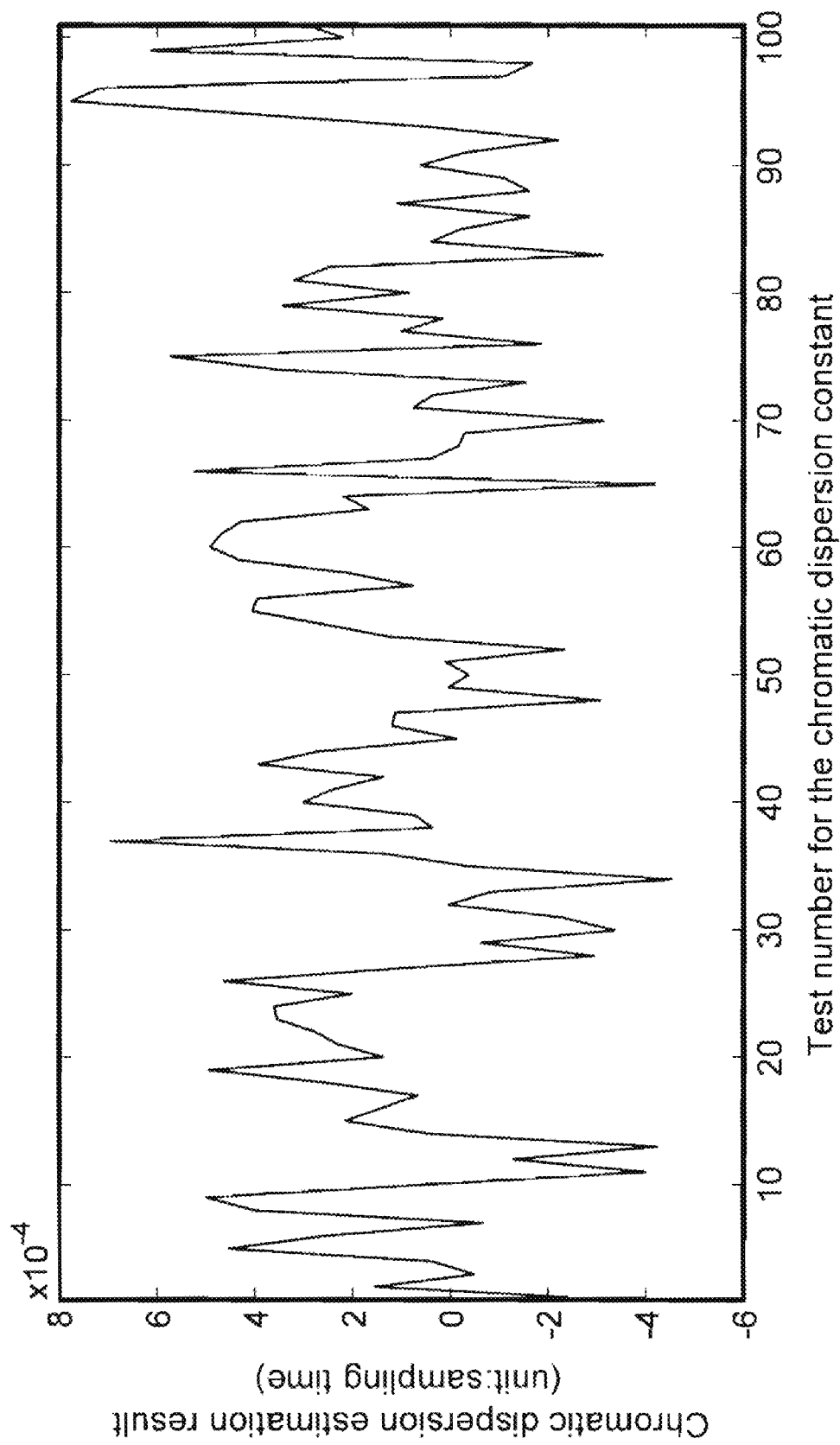
FIG. 13 is a schematic view of a chromatic dispersion constant estimation result tested by the receiver of the optical OFDM system according to the present invention.

Next, FIG. 13 is a schematic view of a chromatic dispersion constant estimation result tested by the receiver of the optical OFDM system according to the present invention. The conditions of the test are the same as that of FIG. 12. The transverse axis of FIG. 13 represents test numbers of the predetermined chromatic dispersion constant, the same as FIG. 12, and the longitudinal axis represents the chromatic dispersion constant estimation result obtained according to the method of the present invention, and the unit is also a sampling time (Ts). Each point in the drawing represents the difference between the chromatic dispersion constant estimation result and the predetermined chromatic dispersion constant value (that is, the two are subtracted). It may be known from FIG. 13 that, the differences between the chromatic dispersion constant estimation results and the predetermined values of the test fall between $-6 \times 10^{-4}$ Ts and $8 \times 10^{-4}$ Ts, that is, the difference values are rather small, which are generated from the effects of the noises and the channel response of the optical fiber.

As clearly known from the above test results, through the receiver 10 or the receiving method according to the present invention, the timing offset and the chromatic dispersion constant can be estimated at a high accuracy. Although the estimation result still has slight errors, the errors may be resulted from other channel effects, for example, polarization mode dispersion (PMD) and noises. As known from the test results that, the slight errors are within an acceptable range, which can meet the demand of the industry. It should be noted that, when the estimation quality of the system is deteriorated as the noises are increased, the calculation and estimation may be performed by using more carrier data, so as to averagely eliminate the errors resulted from the noises, thereby improving the estimation quality, that is, the information of more than three carriers may be used for estimation.

What is claimed is:

1. A method for receiving an optical orthogonal frequency-division multiplexing (OFDM) signal, applicable to an optical OFDM receiver, wherein the receiver receives an optical signal emitted by an optical OFDM emitter, the method comprising:
 converting the optical signal into a digital signal;
 estimating a symbol boundary of the digital signal;
 removing a guard interval of the digital signal according to the symbol boundary, so as to generate a digital electrical signal;
 converting the digital electrical signal into a plurality of frequency domain sub-carriers Y(k) in a fast Fourier transform (FFT) manner, wherein each of the frequency domain sub-carriers comprises a plurality of symbols, the symbols corresponding to the same frequency domain sub-carrier comprise a plurality of data carrier signals and pilot carrier signals, the pilot carrier signals X(k) are located in the same symbol period, wherein k is an integer greater than or equal to −N/2 and smaller than (N/2)−1, and N is an FFT size;
 estimating a timing offset τ with at least three pilot carrier signals X(k) and at least three corresponding frequency domain sub-carriers Y(k) corresponding to the same symbol period; and
 compensating the estimated symbol boundary with the timing offset.

2. The method for receiving an optical OFDM signal according to claim 1, wherein the step of converting the optical signal into the digital signal further comprises:
 performing an optical-to-electrical conversion on the optical signal, so as to generate an analog signal; and
 converting the analog signal into a digital signal.

3. The method for receiving an optical OFDM signal according to claim 1, wherein the step of estimating the symbol boundary of the digital signal further comprises compensating and estimating the symbol boundary of the digital signal according to the timing offset.

4. The method for receiving an optical OFDM signal according to claim 1, wherein the frequency domain sub-carriers are parallel on a time axis.

5. The method for receiving an optical OFDM signal according to claim 1, wherein the step of estimating the timing offset τ with at least three pilot carrier signals X(k) and at least three corresponding frequency domain sub-carriers Y(k) corresponding to the same symbol period further comprises:
 estimating a first phase rotation difference with two pilot carrier signals X(k1) and X(k2) and two corresponding frequency domain sub-carriers Y(k1) and Y(k2);
 estimating a second phase rotation difference with another two pilot carrier signals X(k3) and X(k4) and corresponding frequency domain sub-carriers Y(k3) and Y(k4); and
 estimating the timing offset according to the first phase rotation difference and the second phase rotation difference;
 wherein k1, k2, k3, and k4 are integers greater than or equal to −N/2 and smaller than (N/2)−1, N is the FFT size, k2>k1, k4>k3, and k2−k1=k4−k3.

6. The method for receiving an optical OFDM signal according to claim 5, wherein the first phase rotation difference is represented as $$\text{angle}(E(k2, k1)) \cong \text{angle}\left(conj\left(\frac{Y(k2)}{X(k2)}\right) \cdot \left(\frac{Y(k1)}{X(k1)}\right)\right),$$

the second phase rotation difference is represented as $$\text{angle}(E(k4, k3)) \cong \text{angle}\left(conj\left(\frac{Y(k4)}{X(k4)}\right) \cdot \left(\frac{Y(k3)}{X(k3)}\right)\right),$$

the timing offset τ is $$\tau = \frac{\left[k4 \cdot \left(k4 + \frac{N}{2}\right) - k3 \cdot \left(k3 + \frac{N}{2}\right)\right] \cdot \frac{N}{2 \cdot \pi} \cdot \text{angle}(E(k2, k1)) - \left[k2 \cdot \left(k2 + \frac{N}{2}\right) - k1 \cdot \left(k1 + \frac{N}{2}\right)\right] \cdot \frac{N}{2 \cdot \pi} \cdot \text{angle}(E(k4, k3))}{\left\{\left[k4 \cdot \left(k4 + \frac{N}{2}\right) - k3 \cdot \left(k3 + \frac{N}{2}\right)\right] - \left[k2 \cdot \left(k2 + \frac{N}{2}\right) - k1 \cdot \left(k1 + \frac{N}{2}\right)\right]\right\} \cdot \Delta k},$$

and
 angle (E(k2,k1)) is the first phase rotation difference; angle (E(k4,k3)) is the second phase rotation difference; conj represents a complex-conjugate multiplication; N is the FFT size; Δk=k2−k1=k4−k3; Y(k1), Y(k2), Y(k3), and Y(k4) are respectively frequency domain sub-carriers at k1, k2, k3, and k4 corresponding to the symbol period; and X(k1), X(k2), X(k3), and X(k4) are respectively pilot carrier signals at k1, k2, k3, and k4 corresponding to the symbol period.

7. The method for receiving an optical OFDM signal according to claim 5, wherein the step of estimating the timing offset τ with at least three pilot carrier signals X(k) and at least three corresponding frequency domain sub-carriers Y(k) corresponding to the same symbol period further comprises:
 estimating a chromatic dispersion constant B according to the first phase rotation difference and the second phase rotation difference.

8. The method for receiving an optical OFDM signal according to claim 7, wherein the chromatic dispersion constant B is represented as $$B \cong \frac{\frac{N}{2 \cdot \pi} \cdot \left[\begin{array}{l}\text{angle}(E(k4, k3)) - \\ \text{angle}(E(k2, k1))\end{array}\right]}{\left[k4 \cdot \left(k4 + \frac{N}{2}\right) - k3 \cdot \left(k3 + \frac{N}{2}\right)\right] - \left[k2 \cdot \left(k2 + \frac{N}{2}\right) - k1 \cdot \left(k1 + \frac{N}{2}\right)\right]}$$

$$\text{angle}(E(k2, k1)) \cong \text{angle}\left(conj\left(\frac{Y(k2)}{X(k2)}\right) \cdot \left(\frac{Y(k1)}{X(k1)}\right)\right)$$

$$\text{angle}(E(k4, k3)) \cong \text{angle}\left(conj\left(\frac{Y(k4)}{X(k4)}\right) \cdot \left(\frac{Y(k3)}{X(k3)}\right)\right)$$

wherein angle (E(k2,k1)) is the first phase rotation difference, angle (E(k4,k3)) is the second phase rotation difference, N is the FFT size, and Δk=k2−k1=k4−k3.

9. The method for receiving an optical OFDM signal according to claim 1, further comprising: compensating the frequency domain sub-carriers with the timing offset.

10. The method for receiving an optical OFDM signal according to claim 9, wherein the step of compensating the frequency domain sub-carriers with the timing offset further comprises:

converting the timing offset into a phase offset; and
compensating the frequency domain sub-carriers with the phase offset.

11. A receiver of an optical orthogonal frequency-division multiplexing (OFDM) system, adapted to receive an optical signal emitted by an emitter of the optical OFDM system, comprising:
an optical-to-electrical converting element, for receiving and converting the optical signal into an analog signal;
an analog-to-digital converting element, for converting the analog signal into a digital signal;
a symbol boundary estimator, for estimating a symbol boundary according to the digital signal;
a guard interval removal element, for removing a guard interval of the digital signal according to the symbol boundary, so as to generate a digital electrical signal;
a fast Fourier transform (FFT) element, for converting the electrical signal into a plurality of frequency domain sub-carriers Y(k) in an FFT manner, wherein each of the frequency domain sub-carriers comprises a plurality of symbols, the symbols corresponding to the same frequency domain sub-carrier comprise a plurality of data carrier signals and pilot carrier signals, and the pilot carrier signals X(k) are located in the same symbol period, wherein k is an integer greater than or equal to −N/2 and smaller than (N/2)−1, and N is an FFT size; and
a timing offset estimator, for estimating a timing offset τ with the pilot carrier signals X(k) and four frequency domain sub-carriers Y(k) corresponding to the same symbol period, wherein the symbol boundary estimator compensates and estimates the symbol boundary according to the timing offset.

12. The receiver according to claim 11, wherein the timing offset estimator comprises:
a first phase rotation difference estimator, for estimating a first phase rotation difference with two pilot carrier signals X(k1) and X(k2) and two corresponding frequency domain sub-carriers Y(k1) and Y(k2);
a second phase rotation difference estimator, for estimating a second phase rotation difference with another two pilot carrier signals X(k3) and X(k4) and corresponding frequency domain sub-carriers Y(k3) and Y(k4); and
a timing offset extractor, for estimating the timing offset according to the first phase rotation difference and the second phase rotation difference;

wherein k1, k2, k3, and k4 are integers greater than or equal to −N/2 and smaller than (N/2)−1, N is the FFT size, k2>k1, k4>k3, and k2−k1=k4−k3.

13. The receiver according to claim 12, wherein the first phase rotation difference estimator performs a complex-conjugate multiplication on $$\frac{Y(k2)}{X(k2)} \text{ and } \frac{Y(k1)}{X(k1)},$$

and obtains an angle thereof, so as to obtain the first phase rotation difference; the second phase rotation difference estimator performs a complex-conjugate multiplication on $$\frac{Y(k4)}{X(k4)} \text{ and } \frac{Y(k3)}{X(k3)},$$

and obtains an angle thereof, so as to obtain the second phase rotation difference; and the timing offset extractor calculates the timing offset according to a following equation:

$$\frac{\left[k4\cdot\left(k4+\frac{N}{2}\right)-k3\cdot\left(k3+\frac{N}{2}\right)\right]\cdot\frac{N}{2\cdot\pi}\cdot\text{angle}(E(k2,k1))-\left[k2\cdot\left(k2+\frac{N}{2}\right)-k1\cdot\left(k1+\frac{N}{2}\right)\right]\cdot\frac{N}{2\cdot\pi}\cdot\text{angle}(E(k4,k3))}{\left\{\left[k4\cdot\left(k4+\frac{N}{2}\right)-k3\cdot\left(k3+\frac{N}{2}\right)\right]-\left[k2\cdot\left(k2+\frac{N}{2}\right)-k1\cdot\left(k1+\frac{N}{2}\right)\right]\right\}\cdot\Delta k}$$

wherein angle (E(k2,k1)) is the first phase rotation difference; angle (E(k4,k3)) is the second phase rotation difference; N is the FFT size; Δk=k2−k1=k4−k3; Y(k1), Y(k2), Y(k3), and Y(k4) are respectively the frequency domain sub-carriers at k1, k2, k3, and k4 corresponding to the symbol period; and X(k1), X(k2), X(k3), and X(k4) are respectively the pilot carrier signals at k1, k2, k3, and k4 corresponding to the symbol period.

14. The receiver according to claim 13, wherein the timing offset estimator further comprises a chromatic dispersion constant extractor, for estimating a chromatic dispersion constant B according to the first phase rotation difference and the second phase rotation difference.

* * * * *